April 20, 1948.     A. J. HORNFECK     2,439,891
MEASURING AND CONTROLLING SYSTEM
Original Filed Oct. 18, 1943    2 Sheets-Sheet 1
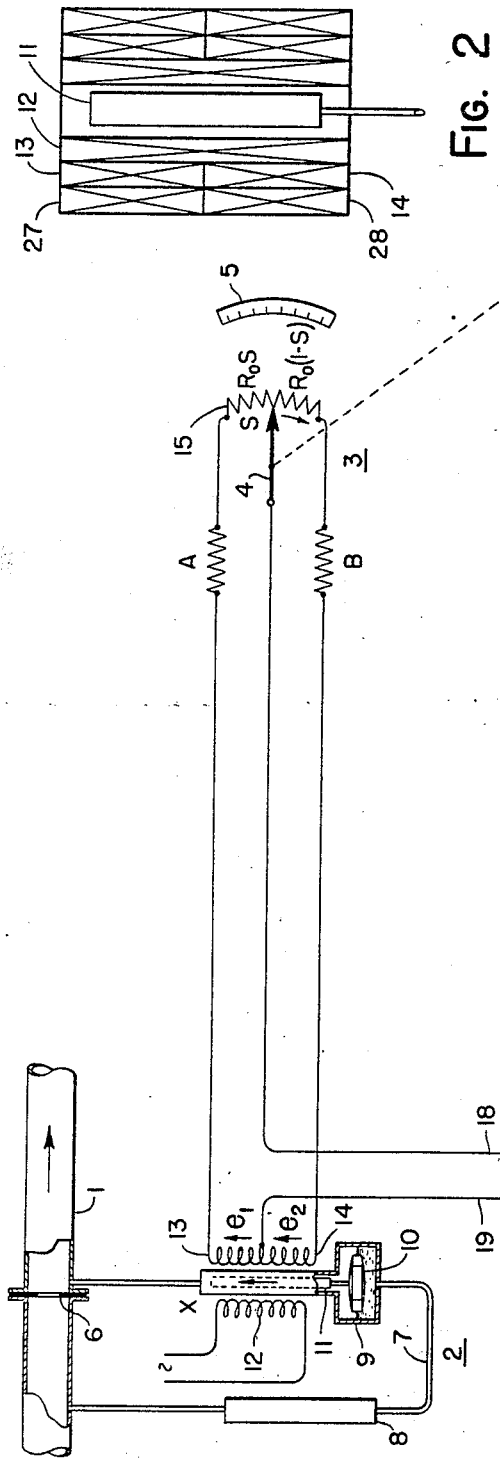
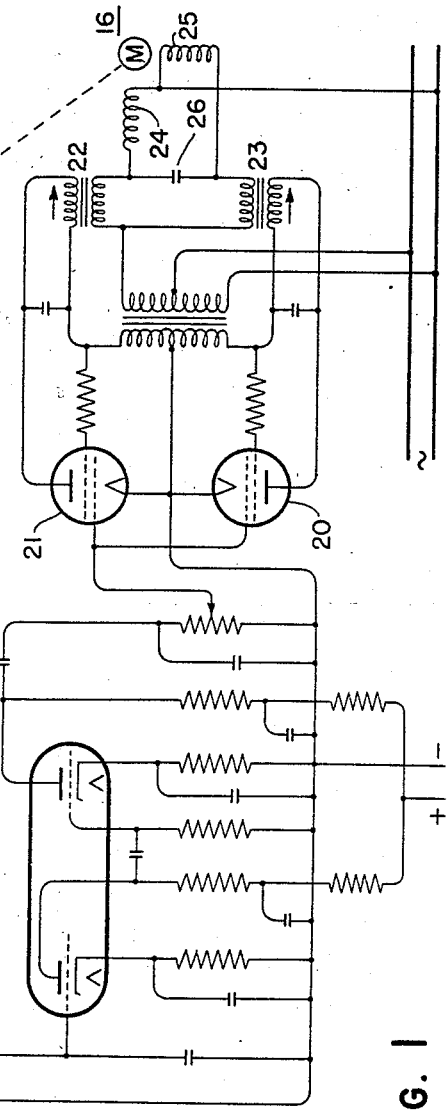
*INVENTOR.*
ANTHONY J. HORNFECK
BY
Raymond D. Jenkins
*ATTORNEY*

INVENTOR.
ANTHONY J. HORNFECK
BY
ATTORNEY

Patented Apr. 20, 1948

2,439,891

UNITED STATES PATENT OFFICE 2,439,891

MEASURING AND CONTROLLING SYSTEM

Anthony J. Hornfeck, Cleveland Heights, Ohio, assignor to Bailey Meter Company, a corporation of Delaware Original application October 18, 1943, Serial No. 506,633, now abandoned. Divided and this application December 23, 1944, Serial No. 569,479

10 Claims. (Cl. 177—351)

This invention relates to telemetric control systems for producing an electrical effect in accordance with the difference between a plurality of variables. The effect may, for example, control suitable means for maintaining a dependent variable in correspondence with a master or independent variable. The variables may be the same or different. One of the variables, for example the independent variable, may be rate of flow of a fluid, humidity, temperature, pressure, electromotive force, or the like, while another of the variables, for example the dependent variable, may be the position of a member. In other cases the independent variable may be the position of a member, and the dependent variable may be the rate of flow, humidity, temperature, pressure, electromotive force, or the like.

In accordance with my invention the magnetic coupling between a primary and a secondary coil or coils is varied in correspondence with one of the variables so that voltages produced in a secondary circuit may correspond in magnitude to the magnitude of one of the variables. The secondary circuit comprises a bridge or balanceable network, a certain portion of which is adjusted by and in accordance with the other variable to rebalance the bridge after the bridge has been unbalanced by a change in the magnetic coupling between the primary and secondary windings mentioned. If the variables are equal or stand in predetermined proportion, the voltages in the bridge are equal or balanced. If proper correspondence does not exist between the variables then an unbalance of voltage will exist in the bridge, which voltage will have a phase depending upon the sense of departure of the independent variable from proper correspondence with the dependent variable. The phase of the voltage determines the direction of operation of suitable electromagnetic means which may or may not be arranged to alter the value of one of the variables to maintain the same in proper correspondence with another of the variables. More particularly one or the other of a pair of electron discharge devices is rendered conducting selectively in accordance with the phase of the voltage or potential between the portions of the network, and the electron discharge devices in turn control the starting, stopping and direction of movement of suitable electromagnetic means, such for example as a motor.

In the drawings:

Fig. 1 is substantially a duplicate of Fig. 18 of my abandoned application Serial No. 506,633, entitled Measuring and controlling systems, of which the present application is a division.

Fig. 2 suggests a possible construction of a five-coil inductor unit, such as the transmitter of Figs. 3 and 4.

Figure 5:
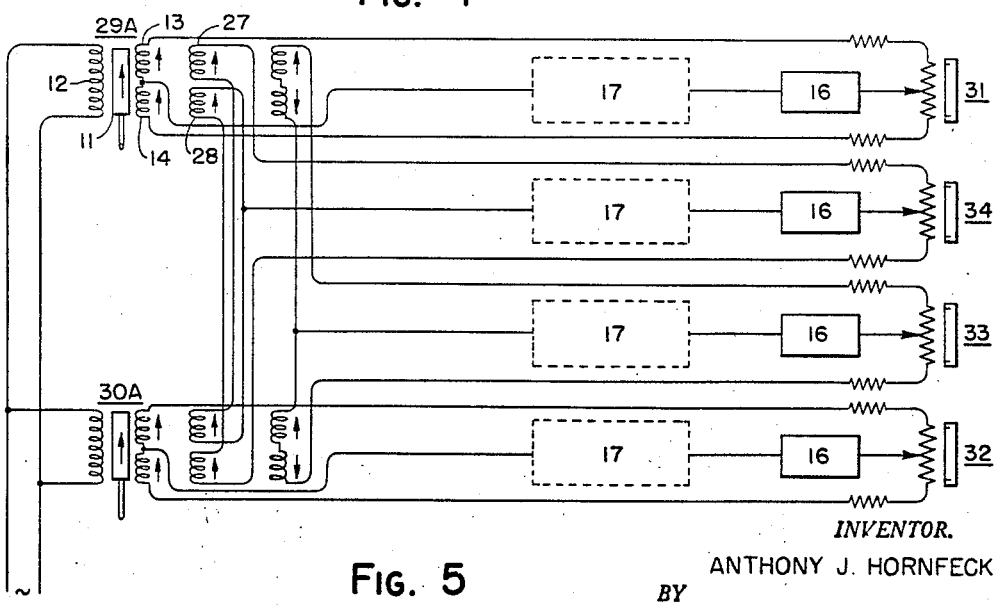

Fig. 5 indicates the possibility of using a seven-coil inductor unit as a transmitter.

As a specific embodiment I have illustrated my invention in the drawings as adapted to telemeter the magnitude of a variable, specifically rate of fluid flow, from a remote or transmitting station to a local or receiving station. It is evident that in this embodiment rate of fluid flow, or position of the transmitting member positioned in accordance therewith, may be considered as the independent variable, and the position of the exhibiting or receiving member as the dependent variable. Lack of correspondence between the independent and dependent variables unbalances a voltage condition which, through suitable relay means, acts to vary the magnitude of the dependent variable until proper correspondence with the independent variable is restored.

There is provided at the transmitter station magnetically coupled primary and secondary coils or windings. At the receiver station an adjustable resistance or potentiometer. The transmitter secondary windings and the receiver potentiometer are included in a bridge or balanceable network. The magnetic coupling between the transmitter primary and secondary windings varies in accordance with changes in the independent variable, and hence the voltage induced in the transmitter secondary winding or windings will be proportional to the magnitude of the independent variable. The proportioning of the receiver potentiometer resistance between certain portions of the bridge circuit is varied in correspondence with changes in the dependent variable. In the present embodiment being described it is the position of the exhibiting means, and hence the voltage relation in the receiver resistance that will be proportional to the magnitude of the dependent variable.

If the position of the exhibiting means properly corresponds to the then existing rate of fluid flow, the voltages in the arms of the bridge are equal or in proper proportion and the bridge is in balance. If such correspondence does not exist, then the voltages will not be equal or in proper proportion and an unbalance of the bridge will exist. Furthermore, a voltage will exist across certain points of the bridge between the receiver and the transmitter, and which voltage will be of one phase if the lack of correspondence is in one sense, and of opposite phase if the lack of correspondence is in the opposite sense. As, for example, the arrangement may be such that upon an increase in the rate of flow a proportionate increase in the voltage in one transmitter secondary winding will result, and a decrease in the other transmitter secondary winding, so that the output voltage of the bridge circuit between the transmitter and receiver will be of one phase, and upon a decrease in the rate of flow a proportionate opposite change in the voltage across the bridge will result, so that the voltage between the transmitter and receiver will be of opposite phase. The phase of this voltage causes selective operation of suitable electromagnetic means for altering the position of the exhibiting means and to restore the same to proper correspondence with the rate of flow.

Referring now to Fig. 1, I therein illustrate my invention as adapted to telemeter the rate of fluid flow through a conduit 1 located adjacent a transmitting station generally indicated at 2 to a receiver station generally indicated at 3. In the receiver station is an exhibiting means specifically illustrated as a movable index 4 adapted to indicate relative to a suitably graduated scale 5 the rate of fluid flow through the conduit 1.

Positioned in the conduit 1 is a restriction, such as an orifice 6, for producing a differential pressure varying in functional relation with the rate of fluid flow. Connected across the orifice is a U-tube 7 having legs 8 and 9 in which is a suitable sealing liquid, such as mercury, which will be displaced from one leg to the other until a difference in height of the two legs corresponds to the differential pressure produced by the orifice 6. Disposed in the leg 9 is a float 10 vertically positioned in response to changes in the height of mercury in the U-tube. Carried by the float 10 is a core piece 11 fabricated of a magnetic material, such as iron or ordinary carbon steel. The core piece 11 is enclosed in a pressure tight cylindrical housing or casing forming a part of the U-tube.

Surrounding the casing is a primary winding 12 magnetically coupled by the core piece 11 to a pair of secondary windings 13, 14. The system is arranged to telemetrically transmit the position of the core piece 11 to the receiver 3, which may be adjacent or remote from the location of the transmitter 2. Preferably the value of the variable (in this example fluid rate of flow), as represented by the position of the core piece 11, is continuously indicated by the marker 4 relative to the index scale 5.

The arrangement of Fig. 1 comprises a mutual inductor potentiometer bridge circuit wherein the transmitter employs a 3-coil mutual inductor or movable core transformer and the receiver 3 employs a potentiometer or resistance winding 15 divided into two portions by the movable contact arm 4, which is positioned by a motor 16 for rebalancing the network.

The bridge circuit includes the secondary windings 13, 14, the potentiometer resistance 15, fixed resistances A and B, as well as an amplifier 17 for controlling rotation of the motor 16. In this circuit 15 is a potentiometer of relatively high resistance $R_0$ (5,000 ohms or more); the contact 4 of which is positioned by the reversing motor 16. A and B are fixed resistances for adjustment.

The condition for bridge balance is:

$$\frac{e_1}{e_2} = \frac{A + R_0 S}{B + R_0(1-S)} \quad (1)$$

where
$R_0$ = resistance of receiver potentiometer 15;
$e_1$ and $e_2$ are functions of the position of core 11;
$x$ is travel of core 11 from 0 to 1;
$S$ is travel of contact 4 from 0 to 1.

By restricting the motion of the plunger and by proper design of inductor these quantities $e_1$ and $e_2$ can be made to vary with $x$ in a straight line manner as follows:

$$e_1 = E_0 + e\,x \quad (2)$$
$$e_2 = E_0 + e\,(1-x)$$

If $A = B = R_0 \dfrac{E_0}{e}$ in Equation 1 then $x = S$

The ratio $e_1/e_2$ is a function only of the position of the magnetic core 11 and is not affected by the magnitude, frequency or phase of the exciting voltage. The accuracy of positioning is practically independent of phase shift of the exciting voltage on the mutual inductor. For this reason ambient temperature changes of the windings 12, 13, 14 and line resistance have negligible effect on the balance of the receiver. However, the primary winding 12 must be supplied from the same electrical source and from the same phase (if a 3-phase system) as the motor winding.

It will be observed that the bridge including windings 13 and 14, as well as resistance A, B, $R_0 S$, and $R_0(1-S)$ is not a conventional bridge to which a source of power is directly applied. The power supply is obtained through the magnetic coupling of core piece 11 between the primary winding 12 and the windings 13, 14. The induced voltages have been represented as $e_1$ and $e_2$ and are functions of the position of core 11. In a steady state or balanced condition the percentage of total movement $x$ being equal to the percentage of total movement $S$, there is an electrical balance established in the bridge and there is no voltage or current flow through the conjugate conductor comprising the conductors 18, 19.

If the position of the core 11 is changed (as by a change in the variable represented by the position of the core 11) then the ratio $e_1/e_2$ is varied and a potential established in the conjugate conductor 18, 19 whose magnitude is representative of the magnitude of the change in position of the core 11 while the phase of the potential in the conjugate conductors 18, 19 is representative of the sense of change in position of the core piece 11. In other words, if the core 11 were moved upwardly, then the phase of the potential in the conductor 18, 19 would be in one direction, while if the core 11 were moved downwardly the phase of the potential in the conductor 18, 19 would be of opposite sense.

A voltage existing in the conjugate conductor 18, 19, through suitable amplifying and relay means hereinafter to be described, selectively operates the motor 16 in one direction or the other in accordance with the phase of the voltage. As shown, the motor 16 is employed to position the contact arm 4 along the resistance 15 to balance the network. The direction of operation of the motor 16 is such that the arm 4 is moved toward correspondence with the position of the core piece 11, and when such correspondence is obtained the potential in the conductor 18, 19 is balanced.

The voltage existing in the conductor 18, 19 is first amplified by means of an electron discharge device disclosed and claimed in Patent 2,275,317 to John D. Ryder. Any movement of the core 11 causes an unbalance of the network and the direction and extent of unbalance is felt in the conjugate conductor 18, 19 and applied to the amplifier 17, which in turn controls two electron discharge devices 20, 21. The output circuits of the tubes 20, 21 are individually included in the circuits of saturating windings of saturable core reactors 22, 23, having alternating current output windings in a loop circuit including motor windings 24, 25 and capacitor 26.

The capacitor-run motor 16 is of a type wherein rotation is obtained in one direction when current flow is directly through the winding 24, and simultaneously through the winding 25 in series with the capacitor 26. Rotation in the opposite direction is obtained when current flow is directly through the winding 25 and is simultaneously through the winding 24 in series with the capacitor 26. Desired directional rotation of the motor 16 is accomplished by preponderance of saturation in the saturating windings of the reactors 22, 23. Whichever reactor predominates determines the direction of rotation of the motor, while the amount of predominance determines the speed of rotation.

The motor 16 is connected to position the contact 4 along a potentiometer resistance 15 in proper direction and amount to rebalance the network and stop the motor 16. The position of the arm 4 is indicative of the position of the core 11, and therefore of the differential pressure or rate of fluid flow. Thus the motor 16 indicates the value of the variable (rate of flow in this example) and rebalances the network following an unbalance thereof.

A particular feature of the present invention is the provision of a transmitter which simultaneously transmits to a plurality of receivers to accomplish several mathematical operations. For example, the transmitter 2 may simultaneously transmit to the receiver 3 to remotely indicate the value of differential pressure or rate of fluid flow and at the same time may, at a different location, interrelate the rate of flow through the conduit 1 with another variable to obtain the ratio thereof, or to totalize the two upon a separate receiving indicator. The multiple usage of the transmitter is possible through the magnetic coupling of the primary 12 with a plurality of pairs of secondary windings. For example, referring to Fig. 2, the core piece 11 may couple the primary 12 with the secondaries 13, 14, and simultaneously with secondaries 27, 28. As a matter of fact the transmitter as diagrammatically shown in Fig. 2 is not limited to a total of two pair of secondary windings, but may have additional secondaries limited only by physical dimensions, number of available terminals, or eventually by distance between the core 11 and the outermost windings.

Figure 3:
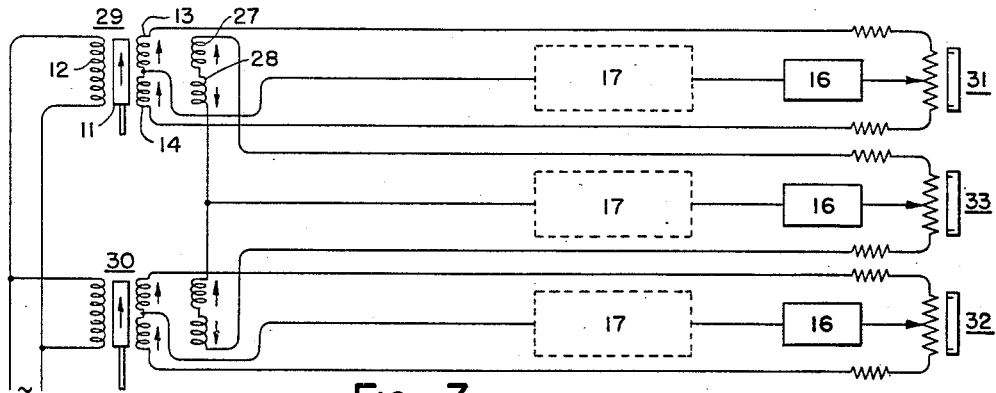
Fig. 3 is a duplicate of Fig. 21 of my said parent application.

I have clearly disclosed, in my parent application Serial No. 506,633, and particularly with reference to Figs. 8 and 21 thereof, the interconnection of two transmitters $T_1$ and $T_2$ to perform a ratio function at a single receiver. Fig. 3 is a duplicate of Fig. 21 of said parent application, and discloses two transmitters 29, 30, each individually indicating as at 31, 32 respectively the value of the variable which positions the transmitters; and the two transmitters 29, 30 simultaneously producing upon the receiver 33 a result which may be the ratio of the variables to which the transmitters 29, 30 are responsive. In Fig. 3 I have not felt it necessary to duplicate the detailing of the amplifier 17 and the motor 16, which I have explained in connection with Fig. 1. It will be observed that the transmitter 29 and the transmitter 30 are similar in construction, and that each of them is of the general arrangement depicted in Fig. 2, i. e. the movable core 11 inductively couples the primary winding 12 with a pair of secondary windings 13, 14, and at the same time with a second pair of secondary windings 27, 28.

Thus in Fig. 3 the transmitter 29 indicates its variable upon the receiver 31. The transmitter 30 indicates its variable upon the receiver 32. The ratio of the variables (to which the transmitters 29, 30 are sensitive) is continuously indicated upon the receiver 33.

Figure 4:
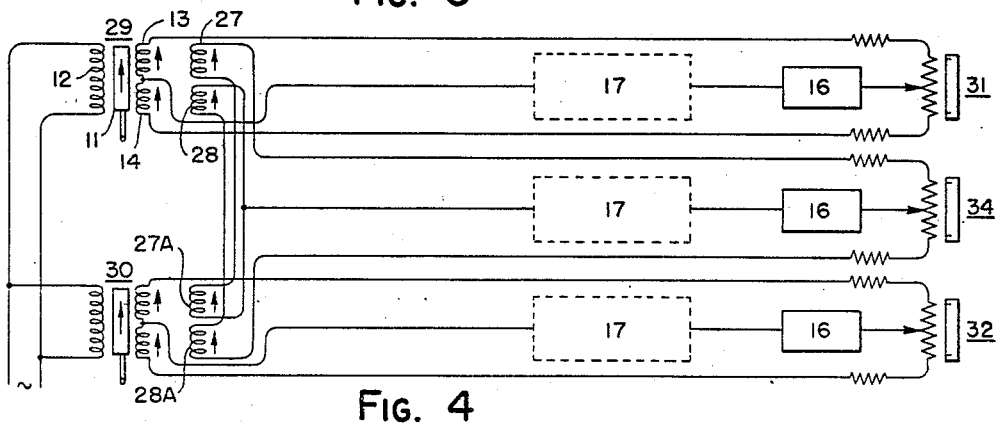
Fig. 4 is similar to Fig. 3, but diagrammatically indicates a totalization circuit.

In Fig. 4 I illustrate an arrangement wherein the transmitters 29 and 30 are each of the five-winding type depicted in Fig. 2. The transmitter 29 indicates directly upon the receiver 31, while the transmitter 30 indicates directly upon the receiver 32. The receiver 34 totalizes the variables to which the transmitters 29 and 30 are sensitive. By proper reversal of connections to the windings 27, 28 the receiver 34 may give an indication of subtraction of the variables represented by the transmitters 29 and 30. If the core 11 of 29 moves upwardly for an increase in rate of flow, and the core 11 of 30 moves upwardly for an increase in rate of flow, then the receiver 34 will indicate the total of the two rates of flow. If one of the cores moves upwardly for an increase in rate of flow and the other moves downwardly for an increase in rate of flow, then the receiver 34 will indicate a subtraction of one rate from the other rate. If the interconnection of the secondaries 27, 28, 27A, 28A is switched from that shown in Fig. 4 to a condition wherein 27 and 28A are in series, while 28 and 27A are in series, then the indicator of 34 will subtract either variable from the other and move in one direction or the other from a central zero on the indicator scale.

In Fig. 5 I indicate that it is clearly possible to construct the transmitter 29A, or the transmitter 30A, to have a total of seven windings. This is really a combination of the functions indicated for Figs. 3 and 4, and provides for the receivers 31, 32 to give individual indications of the variables. The receiver 33 provides a ratio while the receiver 34 provides a totalization.

It will be apparent that with the invention which I have disclosed herein I may utilize a single transmitter to transmit the value of a variable position or condition to effect a plurality of calculations or combinations rather than having to provide a number of transmitters, all actuated representative of the same variable, one for each of the calculations to be performed.

Certain features of my invention, disclosed but not claimed herein, are disclosed and claimed in my copending application S. N. 3,666 filed January 22, 1948.

What I claim as new, and desire to secure by Letters Patent of the United States, is:

1. A telemetric measuring system, including in combination, two transmitters each having an alternating current energized primary winding, a pair of similarly wound secondary windings, a pair of bucking secondary windings, and a magnetic core piece cooperating with the five windings, said core piece positioned relative the windings in accordance with the magnitude of a variable which may be a different variable for the two transmitters; a pair of receivers, one for each transmitter, each including a resistance winding and a contact arm for dividing the resistance; the similarly wound secondary windings of a transmitter and the resistance forming a balanceable loop network having a conjugate conductor joining the mid point of the two similar secondary windings with the contact arm; a motor for positioning each contact arm; and electronic means in said conjugate sensitive to direction and magnitude of energy therein and adapted to directionally rotate the respective motor; a separate receiver including a resistance in loop with the bucking secondary windings of both transmitters and having a dividing contact arm; a conjugate conductor having one end joining the last named contact arm with a point between the two pair of bucking secondary windings; a motor for positioning the last named contact arm in accordance with the ratio of the values of the two variables; and electronic means in said last named conjugate sensitive to direction and magnitude of energy therein for operating the last named motor.

2. A telemetric system, including in combination, a plurality of transmitters each having an alternating current energized primary winding and a plurality of pairs of secondary windings inductively energized from said primary, a magnetic core piece coupling said windings variably in dependence upon a variable such as a condition or quantity or position which is to be remotely transmitted, a receiver for each of the transmitters electrically connected to a pair of secondary windings and adapted to indicate the value transmitted from each transmitter, and a separate receiver electrically connected to a separate pair of secondary windings of each of the transmitters and adapted to indicate the ratio of the values transmitted by the transmitters.

3. The combination of claim 2 wherein the separate receiver is adapted to continuously totalize the values transmitted by all the transmitters.

4. The combination of claim 2 wherein the separate receiver is adapted to continuously subtract the values transmitted by the transmitters.

5. The combination of claim 2 including a second separate receiver connected to a separate pair of secondary windings of each of the transmitters and adapted to totalize the values to which all of the transmitters are responsive.

6. A telemetric system, including in combination, a plurality of transmitters each having an alternating current energized primary winding and a plurality of pairs of secondary windings inductively energized from said primary, a magnetic core piece coupling said windings variably in dependence upon a variable such as a condition or quantity or position which is to be remotely transmitted, a receiver for each of the transmitters electrically connected to a pair of secondary windings and adapted to indicate the value transmitted from each transmitter, and a separate receiver electrically connected to a separate pair of secondary windings of each of the transmitters and adapted to indicate a mathematical relation of the individual values transmitted by the several transmitters.

7. A telemetric measuring system, including in combination, two transmitters each having two pairs of equal secondary windings, those in each pair being disposed side by side; an alternating current energized primary arranged symmetrically with respect to the windings of each pair; a magnetic core piece cooperating with the five windings, said core piece positioned relative to the windings in accordance with the magnitude of a variable which may be different for the two transmitters; a pair of receivers, one for each transmitter electrically connected to a pair of secondary windings thereof and adapted to indicate the value transmitted therefrom, and a separate receiver electrically connected to the remaining pair of secondaries of each transmitter and adapted to indicate some mathematical relation of the individual values transmitted by the separate transmitters.

8. A telemetric measuring system including, in combination, a plurality of transmitters each having a primary winding and a plurality of secondary windings inductively energized from said primary winding, each having a magnetic core piece coupling its primary winding with its secondary windings variably in dependence upon a variable, a receiver for each of the transmitters electrically connected to at least one of its secondary windings and adapted to indicate the values of the variable, and a separate receiver electrically connected to a separate winding of each transmitter and adapted to indicate a mathematical relation of the individual values of the variables.

9. A telemetric measuring system including, in combination, a pair of transmitters each having a primary winding, a pair of secondary windings connected in series bucking, and a core piece positionable relative to the windings in response to a variable, a common source of alternating current for the primary windings, a balanceable bridge including the pair of secondary windings of one transmitter in one of its arms, the pair of secondary windings of the other transmitter in a second arm, and a resistance proportioned by a movable contact to form its third and fourth arms, a conjugate bridge connection between the junction of said pairs of secondary windings and said movable contact, means included in said conjugate connection and sensitive to bridge unbalance in either direction, and means controlled by said sensitive means for shifting said contact along said resistance, said last mentioned means operating on bridge unbalance to shift said contact along the resistance until the bridge is rebalanced and thereby indicates a ratio of the variables.

10. Apparatus for continuously obtaining the ratio of two variables including, in combination, means responsive to a first variable positioning a movable magnetic core relative to a primary winding and a first pair of secondary windings, means responsive to a second variable positioning a second movable magnetic core relative to a second primary winding and a second pair of secondary windings, a source of alternating current for the primary windings, the secondary windings of each pair connected in series bucking and each pair of secondary windings connected in series with each other and with a resistance, said resistance comprising a receiver and having a contact movable thereacross and whose position is representative of the ratio of the variables, a conjugate conductor connecting the joining of the two pair of secondary windings with the movable contact, amplifying means in said conductor sensitive to the phase of the unbalanced voltage induced in the series circuit, and motive means controlled by said amplifying means adapted to position said contact.

ANTHONY J. HORNFECK.

REFERENCES CITED

The following references are of record in the file of this patent:

UNITED STATES PATENTS

| Number | Name | Date |
|---|---|---|
| 1,431,627 | Bristol et al. | Oct. 10, 1922 |
| 1,850,640 | Sperry | Mar. 22, 1932 |
| 1,925,904 | Mayne | Sept. 5, 1933 |
| 1,955,322 | Brown | Apr. 17, 1934 |
| 2,050,629 | Quereau et al. | Aug. 11, 1936 |
| 2,155,267 | Hathaway | Apr. 18, 1939 |
| 2,285,540 | Stein et al. | June 9, 1942 |
| 2,349,963 | Harrison | May 30, 1944 |
| 2,293,403 | Rayek | Aug. 18, 1942 |
| 2,354,365 | Crossley | July 25, 1944 |